(12) United States Patent
Nagao

(10) Patent No.: US 10,525,559 B2
(45) Date of Patent: Jan. 7, 2020

(54) TELESCOPIC COVER

(71) Applicant: FANUC Corporation, Yamanashi (JP)

(72) Inventor: Akihiko Nagao, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/375,998

(22) Filed: Dec. 12, 2016

(65) Prior Publication Data

US 2017/0173752 A1    Jun. 22, 2017

(30) Foreign Application Priority Data

Dec. 17, 2015   (JP) .................. 2015-246200

(51) Int. Cl.
    *B23Q 11/08*    (2006.01)
(52) U.S. Cl.
    CPC ...... *B23Q 11/0825* (2013.01); *B23Q 11/0875* (2013.01)
(58) Field of Classification Search
    CPC . B23Q 11/08; B23Q 11/0825; B23Q 11/0875; Y10T 74/3293
    See application file for complete search history.

(56) References Cited

U.S. PATENT DOCUMENTS 6,082,716 A    7/2000  Tabellini

FOREIGN PATENT DOCUMENTS

| JP | S63176045 U | 11/1988 |
|----|-------------|---------|
| JP | 6-27041 U | 4/1994 |
| JP | H0760593 A | 3/1995 |
| JP | 3067052 U | 3/2000 |
| JP | 2009184026 A | 8/2009 |

OTHER PUBLICATIONS

Machine Translation of JP 2009-184026, obtained Jan. 6, 2018.*
Machine Translation of JP H0627041, obtained Jan. 2, 2019.*
Office Action in JP Application No. 2015-246200, dated Nov. 21, 2017, 7 pp.
Office Action in JP Application No. 2015-246200, dated Nov. 20, 2018, 9pp.

* cited by examiner

Primary Examiner — Richard W Ridley
Assistant Examiner — Brian J McGovern
(74) Attorney, Agent, or Firm — Hauptman Ham, LLP

(57) ABSTRACT

A telescopic cover has a plurality of cover pieces nested in the order of their size for extension and retraction. A rubber cushion is on a side surface of an end portion of an insert-side cover piece, a wiper is inside an upper surface of a receiving-side cover piece receiving the insert-side cover piece so as to contact the upper surface of the insert-side cover piece, and a stopper is on the inner side surface of the end portion so as to be offset from the position of the wiper and face the rubber cushion. When the telescopic cover is retracted so that the respective end surfaces of the receiving-side and insert-side cover pieces become flush with each other, a gap between the cover pieces is closed by the wiper.

4 Claims, 2 Drawing Sheets

TELESCOPIC COVER

RELATED APPLICATIONS

The present application claims priority to Japanese Patent Application Number 2015-246200, filed Dec. 17, 2015, the disclosure of which is hereby incorporated by reference herein in its entirety.

BACKGROUND OF THE INVENTION

Field of the Invention

The present invention relates to a telescopic cover for use as a movable cover of a machine tool.

Description of the Related Art

In a machine tool, sliding surfaces and drive parts, such as ball screws, are expected to be protected from chips and cutting fluid. Moreover, a movable cover generally called a telescopic cover that extends and retracts during axial movement is used in order to restrict the size of the machine tool. This telescopic cover or a movable cover is configured so that a plurality of cover pieces of different sizes are stacked in a nested fashion in the order of their size such that the entire structure can extend and retract in the inserting direction of the cover pieces.

As a widely used mechanism for extending and retracting the telescopic cover, there is a mechanism that uses, for example, a pantograph to extend and retract the cover in synchronism with machine movement by a feed axis (see Japanese Patent Application Laid-Open No. 2009-184026). Moreover, there is another known telescopic cover that is configured so that wipers are disposed on the distal end portions of the cover pieces of the telescopic cover to prevent penetration of chips, dust, cutting fluid and the like into a gap between the cover pieces (see Japanese Patent Applications Laid-Open Nos. 2009-184026 and 7-60593).

Further, there is a known technique in which a stopper is provided on a cover piece of a telescopic cover to restrict the stroke of the cover piece, thereby suppressing extension and retraction of the telescopic cover (see Japanese Patent Application Laid-Open No. 63-176045). As a means for limiting the extension and retraction of the telescopic cover, an extension/retraction suppressing mechanism is generally constructed such that a stopper is provided on one of cover pieces on the insert side (accommodated side) and the inset receiving side (accommodating side) and a buffer member such as a rubber cushion is provided on the other cover piece.

FIGS. 3A and 3B are views showing an example of the extension/retraction limiting mechanism of a conventionally used telescopic cover. In this example, the extension/retraction suppressing mechanism is formed by stoppers and rubber cushions provided on the cover pieces of a telescopic cover 1. This telescopic cover 1 comprises a first cover piece 10a, a second cover piece 10b that serves as an insert to be received in the first cover piece 10a, and a third cover piece 10c that serves as an insert to be received in the second cover piece 10b. FIG. 3A is a front view showing a state in which the telescopic cover 1 is retracted to its minimum length, and FIG. 1B is a front view showing a state in which the telescopic cover 1 is extended to its maximum length.

One of rubber cushions 11 is mounted on the inside surface of the top plate of the receiving-side cover piece receiving the insert-side cover piece, and a stopper 12 and a wiper 13 are provided on the outside surface of the upper surface of the receiving side thereof to receive the cover piece as the insert. In FIGS. 3A and 3B, the rubber cushions 11 are individually mounted inside the cover piece top plate at the left ends (insert-side cover piece accommodating ends) of the first and second receiving-side cover pieces 10a and 10b, and moreover, wipers 13 are provided on the upper surface ends of the cover pieces. The stoppers 12 are individually provided outside the cover piece top plate at the right ends (the end facing the receiving-side cover piece) of the second and third insert-side cover pieces 10b and 10c. Consequently, the second and third cover pieces 10b and 10c can move to the left from the state of FIG. 3A until the stoppers 12 thereon abut their corresponding rubber cushions 11. Thus, the telescopic cover 1 can be extended to the state shown in FIG. 3B. Furthermore, the wipers 13 serve to wipe off chips and other substances adhering to the upper surfaces of the insert-side cover pieces 10b and 10c, thereby preventing their penetration into gaps between the cover pieces. In general, the stoppers (or rubber cushions) and the wipers are integrally formed or the wipers may be designed to be used as the stoppers (or rubber cushions) (see Japanese Patent Application Laid-Open No. 7-60593).

Moreover, FIGS. 4A and 4B are views showing an example of the extension/retraction limiting mechanism in which stoppers 12 and rubber cushions 11 are provided on side surfaces of cover pieces of a telescopic cover 1. Except for the arrangement of the stoppers 12 and the rubber cushions 11 are provided on the cover side surfaces, this example is substantially identical to the example shown in FIGS. 3A and 3B in which the extension/retraction limiting mechanism is provided on the top plates of the cover pieces. Furthermore, also in this case, the positions of the wipers and the stoppers (or rubber cushions) are generally located in line with each other.

Since the wipers are designed to wipe off chips, dust, cutting fluid and other substances adhering to the cover pieces, thereby preventing penetration of the substances into gaps between the cover pieces, they must be provided on the distal end portions of the cover pieces. Therefore, if the wipers and the stoppers are integral with one another (or if the wipers are also used as the stoppers), the arrangement positions of the stoppers are very limited. Moreover, the telescopic cover should follow rapid axial movement and the stoppers and the wipers (buffer members) collide with one another, so that an impact is produced between the cover pieces. Thus, the stoppers and the rubber cushions are components that require periodic maintenance management work. If the stoppers (or rubber cushions) and the wipers are integral with one another, the wipers must also be replaced when the stoppers are replaced, resulting in problematic maintainability.

Moreover, if an attempt is made to form a telescopic cover with the stoppers (or rubber cushions) and the wipers integral with one another, the arrangement positions of the stoppers are limited, so that it is difficult to change the design to make these components compact. Furthermore, as for the structures in which the components are provided on the side surfaces of the cover pieces, the wipers and the stoppers (or rubber cushions) are generally fixed in line with each other. Since the wipers must always be in contact with the cover pieces to close the gaps between the cover pieces, the arrangement positions of the wipers affect the amount of extension and retraction of the telescopic cover as well as the cover stroke.

SUMMARY OF THE INVENTION

Accordingly, the object of the present invention is to provide a telescopic cover capable of being formed in a compact manner while ensuring high maintainability.

A telescopic cover of a machine tool according to the present invention is configured so that a plurality of cover pieces of different sizes are stacked in a nested fashion in the order of their size such that the entire structure is capable of extension and retraction and comprises a wiper provided on an lower surface of a top plate of a receiving-side cover piece and configured to close a gap between the receiving-side cover piece and an insert-side cover piece and wipe off substances adhering to an upper surface of the insert-side cover piece, a buffer member provided on an inner side surface of the receiving-side cover piece in a position offset from a mounting position of the wiper toward the insert-side cover piece and configured to restrict a range of movement of the insert-side cover piece, and a stopper provided on the insert-side cover piece and configured to abut the buffer member, whereby the telescopic cover can be formed in a compact manner to facilitate maintenance management.

Moreover, another telescopic cover of a machine tool according to the present invention is constructed by mounting the stopper and the buffer member of the above-described telescopic cover contrariwise on the cover pieces and comprises a wiper provided on an lower surface of a top plate of a receiving-side cover piece and configured to close a gap between the receiving-side cover piece and an insert-side cover piece and wipe off substances adhering to an upper surface of the insert-side cover piece, a stopper provided on an outer side surface of the receiving-side cover piece in a position offset from a mounting position of the wiper toward the insert-side cover piece and configured to restrict a movement of the insert-side cover piece, and a buffer member provided on the insert-side cover piece and configured to abut the stopper. In either of the telescopic covers of a machine tool described above, the buffer member may be formed of a rubber cushion.

According to the present invention, a compact telescopic cover can be formed. In addition, the working efficiency can be improved even during the replacement of stoppers and buffer members.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

An embodiment of the present invention will now be described with reference to the accompanying drawings.

Figure 1A:
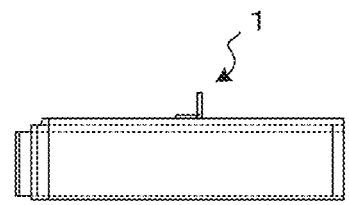
FIG. 1A is a schematic front view of a telescopic cover according to one embodiment of the present invention showing a state in which the telescopic cover is fully retracted to its minimum length.
Figure 1B:
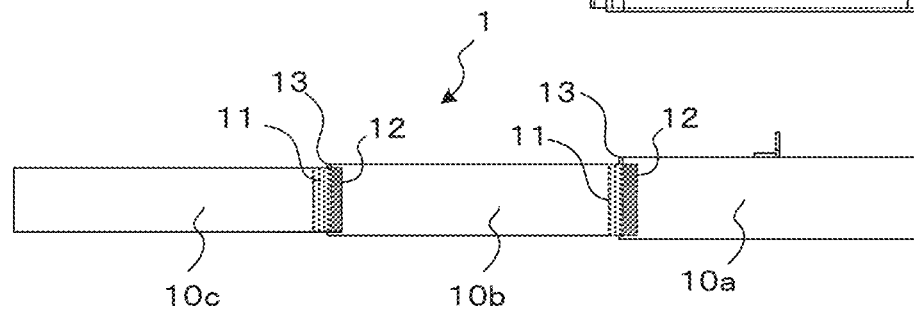
FIG. 1B is a front view showing a state in which the telescopic cover shown in FIG. 1A is fully extended to its maximum length.
Figure 3A:
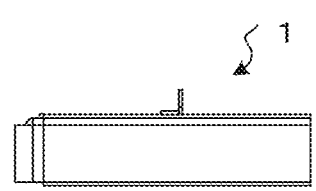
FIG. 3A is a schematic front view of a prior art example of a telescopic cover with an extension/retraction limiting mechanism on its top plate showing a state in which the telescopic cover is fully retracted to its minimum length.
Figure 3B:
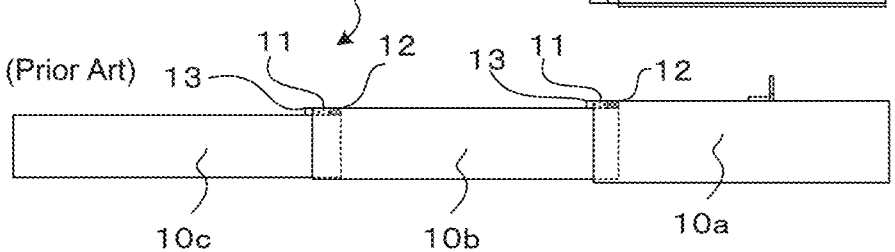
FIG. 3B is a front view showing a state in which the telescopic cover shown in FIG. 3A is fully extended to its maximum length.

FIGS. 1A and 1B are schematic views of one embodiment of the present invention. FIG. 1A is a front view showing a telescopic cover 1 fully retracted to its minimum length, and FIG. 1B is a front view showing the telescopic cover 1 fully extended to its maximum length.

Figure 4A:
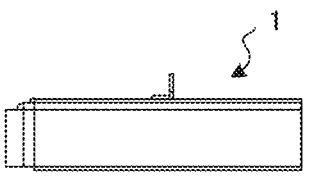
FIG. 4A is a schematic front view of a prior art example of a telescopic cover with an extension/retraction limiting mechanism on its side surface showing a state in which the telescopic cover is fully extended to its maximum length.
Figure 4B:
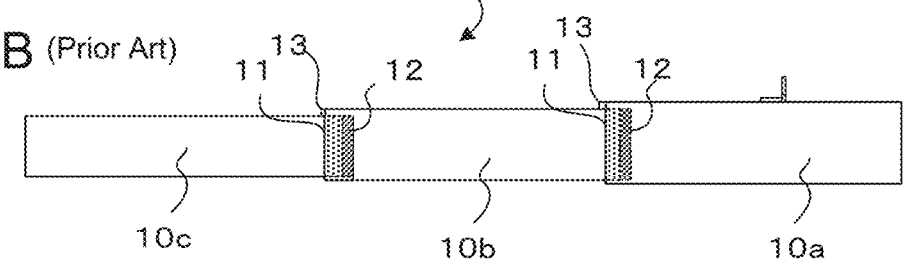
FIG. 4B is a front view showing a state in which the telescopic cover shown in FIG. 4A is fully extended to its maximum length.

The telescopic cover 1 of this embodiment, like the conventional telescopic cover shown in FIGS. 4A and 4B, is provided with stoppers 12 and rubber cushions 11 for use as buffer members on side surfaces of cover pieces.

The telescopic cover 1 comprises first, second, and third cover pieces 10a, 10b and 10c. The second cover piece 10b serves as an insert for the first cover piece 10a, and the third cover piece 10c serves as an insert for the second cover piece 10b. A pair of rubber cushions 11 are provided on the opposite inner side surfaces of the insert-side end of the first cover piece 10a. Moreover, another pair of rubber cushions 11 are also provided on the opposite inner side surfaces of the insert-side end (left-side end in FIGS. 1) of the second cover piece 10b. The second piece 10b is also provided with a pair of stoppers 12 on the opposite outside surfaces of the other end or right-side end thereof (on the side facing the cover piece 10a). Furthermore, another pair of stoppers 12 are provided on the opposite outside surface of the right-side end (on the side facing the cover piece 10b) of the third cover piece 10c. Thus, the rubber cushion 11 on the first cover piece 10a and the stopper 12 on the second cover piece 10b face each other, while the rubber cushion 11 on the second cover piece 10b and the stopper 12 on the third cover piece 10c face each other. As these rubber cushions 11 and stoppers 12 engage one another, the movement of the cover pieces is limited, so that the telescopic cover 1 can be extended from the fully retracted state shown in FIG. 1A to the fully extended state shown in FIG. 1B or retracted in the opposite direction.

The stoppers 12 and the rubber cushions 11 may be mounted vice versa. More specifically, in the example shown in FIGS. 1A and 1B, the rubber cushions 11 and the stoppers 12 are provided on the receiving-side and insert-side cover pieces, respectively. Alternatively, however, the stoppers 12 and the rubber cushions 11 may be provided on the receiving-side and insert-side cover pieces, respectively.

Moreover, wipers 13 are arranged individually on the respective insert-side ends of the first and second cover pieces 10a and 10b that constitute the receiving-side cover pieces so as to be in contact with the upper surfaces of the insert-side cover pieces (second and third cover pieces 10b and 10c). The wipers 13 serve to wipe off chips, dust, cutting fluid and other substances adhering to the upper surfaces of the insert-side cover pieces and close gaps between the insert-side and receiving-side cover pieces, thereby preventing penetration of the chips, dust, cutting fluid and the like through the gaps.

Figure 2:
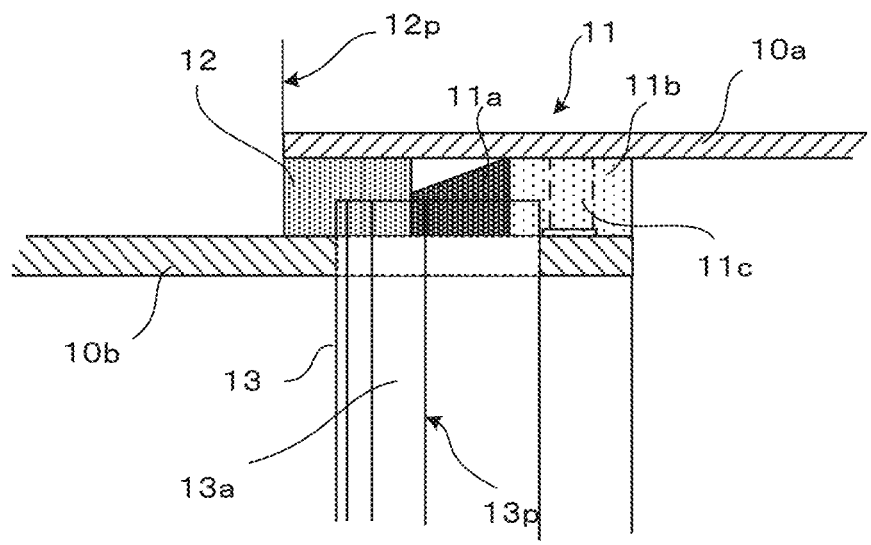
FIG. 2 is an enlarged explanatory view of a principal part according to the embodiment.

FIG. 2 is an enlarged explanatory view of a junction between the first and second cover pieces 10a and 10b with top plates defining the upper surfaces of the cover pieces 10a and 10b removed. The cover pieces mounted with the stopper 12 and the rubber cushion 11 are contrary to those shown in FIG. 1, that is, a stopper and a rubber cushion (buffer member) are mounted on the receiving-side and insert-side cover pieces, respectively. A pair of stoppers 12 are provided inside the opposite side surfaces of the insert-side end of the first cover piece 10a.

Moreover, a wiper 13 is mounted on the inside surface of the insert-side end portion of the top plate of the first cover piece 10a so as to be in contact with the upper surface of the top plate of the second cover piece 10b. Numeral 13a designates a base for mounting on the cover piece. Numerals 12p and 13p designate a stopper mounting position and the mounting position of the wiper 13, respectively. The stopper 12 and the wiper 13 mounted on the first cover piece 10a are constructed independently of each other. The mounting position 13p of the wiper 13 is not restricted by the stopper mounting position 12p, and the stopper 12 is mounted in an offset manner such that it projects toward the second cover piece 10b with respect to the wiper 13.

A pair of rubber cushions 11 are mounted on the opposite outer side surfaces of the end portion of the second cover piece 10b (on the side facing the first cover piece 10a) so as to face the stoppers 12 on the first cover piece 10a. Each rubber cushion 11 comprises a rubber cushion body 11a and a base 11b to which the rubber cushion body 11a is adapted to be mounted. The base 11b is secured to the second cover piece 10b by a setscrew 11c. As can be seen in FIG. 2, the wiper 13 has a front edge in a forward direction (to the left in FIG. 2) in which the entire structure of the stacked cover pieces 10a, 10b, etc. is extendable. The receiving-side cover piece 10a also has a front edge in the forward direction. The front edge of the receiving-side cover piece 10a is offset from and is forward of the front edge of the wiper 13 in the forward direction. In a lateral direction (the up-down direction in FIG. 2) perpendicular to the forward direction, the wiper 13 extends to overlap upper surfaces of the stopper 12 (first member) and the rubber cushion 11 (second member) when the insert-side cover piece 10b and the receiving-side cover piece 10a are in an extended state with the stopper 12 (first member) and the rubber cushion 11 (second member) abutting each other as shown in FIG. 2.

A junction between the second and third cover pieces 10b and 10c is constructed in the same manner. More specifically, the stoppers 12 are mounted on the opposite inner side surfaces of the receiving-side cover piece the wiper 13 are mounted at the end portion of the inner surface of the top plate, while the rubber cushions 11 are mounted on the opposite outer side surfaces of the insert-side cover piece on the side facing the receiving-side cover piece so as to face with the stoppers on the receiving-side cover piece. The stoppers 12 and the wiper 13 on the receiving-side cover piece are mounted in an offset manner such that the stopper 12 is mounted in the position of the insert-side end of the receiving-side cover piece and the wiper 13 is mounted inside of the position of the insert-side end so as to be offset relative to the stopper position.

Consequently, in any extended or retracted state of the telescopic cover 1, the wiper 13 on the receiving-side cover piece contacts the upper surface of the insert-side cover piece to close a gap between the insert-side and receiving-side cover pieces, thereby continually preventing penetration of chips, dust, cutting fluid and the like.

Figure 5:
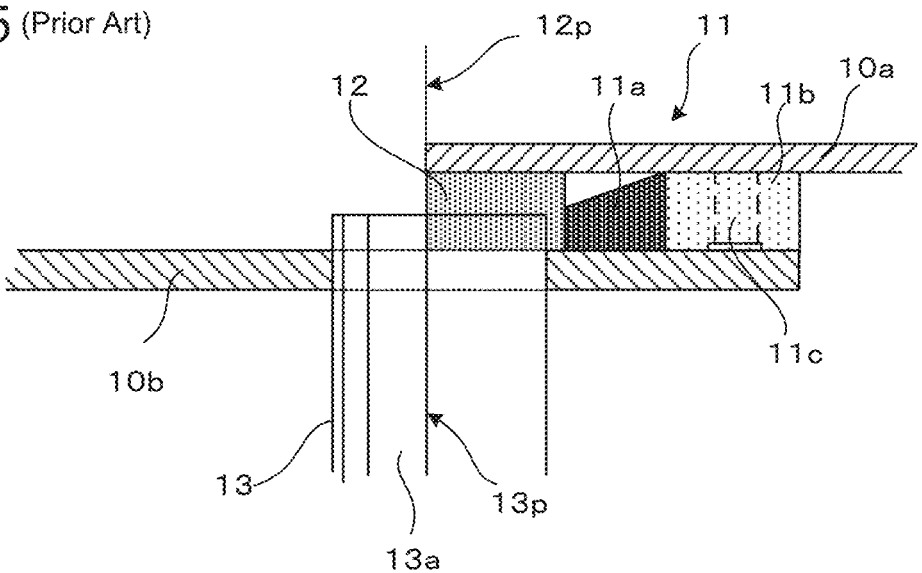
FIG. 5 is an enlarged explanatory view of a principal part of a prior art example.

FIG. 5 is an enlarged explanatory view of a junction between a receiving-side cover piece (10a) and an insert-side cover piece (10b) of a conventional telescopic cover. A stopper 12 and a rubber cushion 11 are identical to those of the embodiment of the present invention shown in FIG. 2 except for the position of a wiper 13.

Conventionally, a mounting position 13p of the wiper and a mounting position 12p of the stopper (or rubber cushion) are fixed on the same straight line in consideration of the metal plate shape. Therefore, the stopper 12 and the wiper 13 are located in an offset manner such that the wiper 13 projects to the insert side with respect to the stopper 12, as shown in FIG. 5.

Consequently, if an attempt is made to continually close the gap between the cover pieces, the retraction of the telescopic cover is restricted by a position in which the end portion of the insert-side cover piece reaches the position of the end of the wiper. If this position is exceeded, the respective upper surfaces of the wiper and the insert-side cover piece are misaligned, so that a gap is formed.

For example, even if the respective left-side end portions of the cover pieces become flush with one another upon retracted the telescopic cover 1 fully as shown in FIG. 1A, the wiper 13 may remain contacted with the upper surface of the insert-side cover plate and close the gap defined between the cover plates in the embodiment of the present invention shown in FIG. 2, since the wiper 13 is located inside of the left-side end of the cover plates. In contrast, in the prior art example shown in FIG. 5, the left-side end portion of the insert-side cover piece (10b) passes through the position of the wiper 13, so that a gap is formed between the insert-side and receiving-side cover pieces. Accordingly, in the prior art example shown in FIG. 5, the left-side end portion of the insert-side cover piece can retreat (to accommodate the insert) only to the wiper position.

Accordingly, the degree of extension and retraction of the telescopic cover of the embodiment of the present invention is higher than that of the prior art example. If the length of the telescopic cover in the fully retracted state is fixed, as shown in FIG. 1A, the telescopic cover of the embodiment of the present invention can cover a larger area when it is fully extended, as shown in FIG. 1B. Thus, the telescopic cover can be formed in a compact manner. Moreover, since the stoppers 12 and the rubber cushions 11 collide with one another when the telescopic cover is extended or retracted, they require periodic maintenance management such as replacement. Since the wipers 13, stoppers 12, and rubber cushions 11 are independently constructed and mounted on the cover pieces, however, they can be individually managed for maintenance, so that the wipers need not be replaced when the stoppers 12 and/or the rubber cushions 11 are replaced.

While an embodiment of the present invention has been described herein, the invention is not limited to the above-described embodiment and may be suitably modified and embodied in various forms.

The invention claimed is:

1. A telescopic cover of a machine tool, comprising:
   a plurality of cover pieces of different sizes stacked in a nested fashion in an order of the different sizes such that an entire structure of the stacked plurality of cover pieces is extendable and retractable, the plurality of cover pieces including a receiving-side cover piece and an insert-side cover piece, the insert-side cover piece telescopically inserted in the receiving-side cover piece;
   a wiper provided on the receiving-side cover piece and configured to close a gap between the receiving-side cover piece and the insert-side cover piece and wipe off substances adhering to an upper surface of the insert-side cover piece;

a first member provided on an inner side surface of the receiving-side cover piece, the first member including a base and a cushioned body, the first member is configured to restrict a range of movement of the insert-side cover piece; and a second member provided on the insert-side cover piece and configured to abut the first member, wherein the wiper has a front edge in a forward direction in which the entire structure of the stacked plurality of cover pieces is extendable, wherein the receiving-side cover piece has a front edge in the forward direction, wherein the front edge of the receiving-side cover piece is offset from and is forward of the front edge of the wiper in the forward direction, and wherein, in a lateral direction perpendicular to the forward direction, the wiper extends to overlap a respective upper surface of the base, cushioned body, and second member when the insert-side cover piece and the receiving-side cover piece are in an extended state with the first member and the second member abutting each other.

2. The telescopic cover according to claim 1, wherein the cushioned body is formed of a rubber cushion.

3. A telescopic cover of a machine tool, comprising:

a plurality of cover pieces of different sizes stacked in a nested fashion in an order of the different sizes such that an entire structure of the stacked plurality of cover pieces is extendable and retractable, the plurality of cover pieces including a receiving-side cover piece and an insert-side cover piece, the insert-side cover piece telescopically inserted in the receiving-side cover piece;

a wiper provided on the receiving-side cover piece and configured to close a gap between the receiving-side cover piece and the insert-side cover piece and wipe off substances adhering to an upper surface of the insert-side cover piece;

a first member provided on an inner side surface of the receiving-side cover piece and configured to restrict a range of movement of the insert-side cover piece; and a second member provided on the insert-side cover piece, the second member including a base and a cushioned body, and the second member is configured to abut the first member, wherein the wiper has a front edge in a forward direction in which the entire structure of the stacked plurality of cover pieces is extendable, wherein the receiving-side cover piece has a front edge in the forward direction, wherein the front edge of the receiving-side cover piece is offset from and is forward of the front edge of the wiper in the forward direction, and wherein, in a lateral direction perpendicular to the forward direction, the wiper extends to overlap a respective upper surface of the base, cushioned body, and the first member when the insert-side cover piece and the receiving-side cover piece are in an extended state with the first member and the second member abutting each other.

4. The telescopic cover according to claim 3, wherein the cushioned body is formed of a rubber cushion.

\* \* \* \* \*